R. T. NEWTON.
VEHICLE.
APPLICATION FILED APR. 13, 1914.
1,273,087.
Patented July 16, 1918.
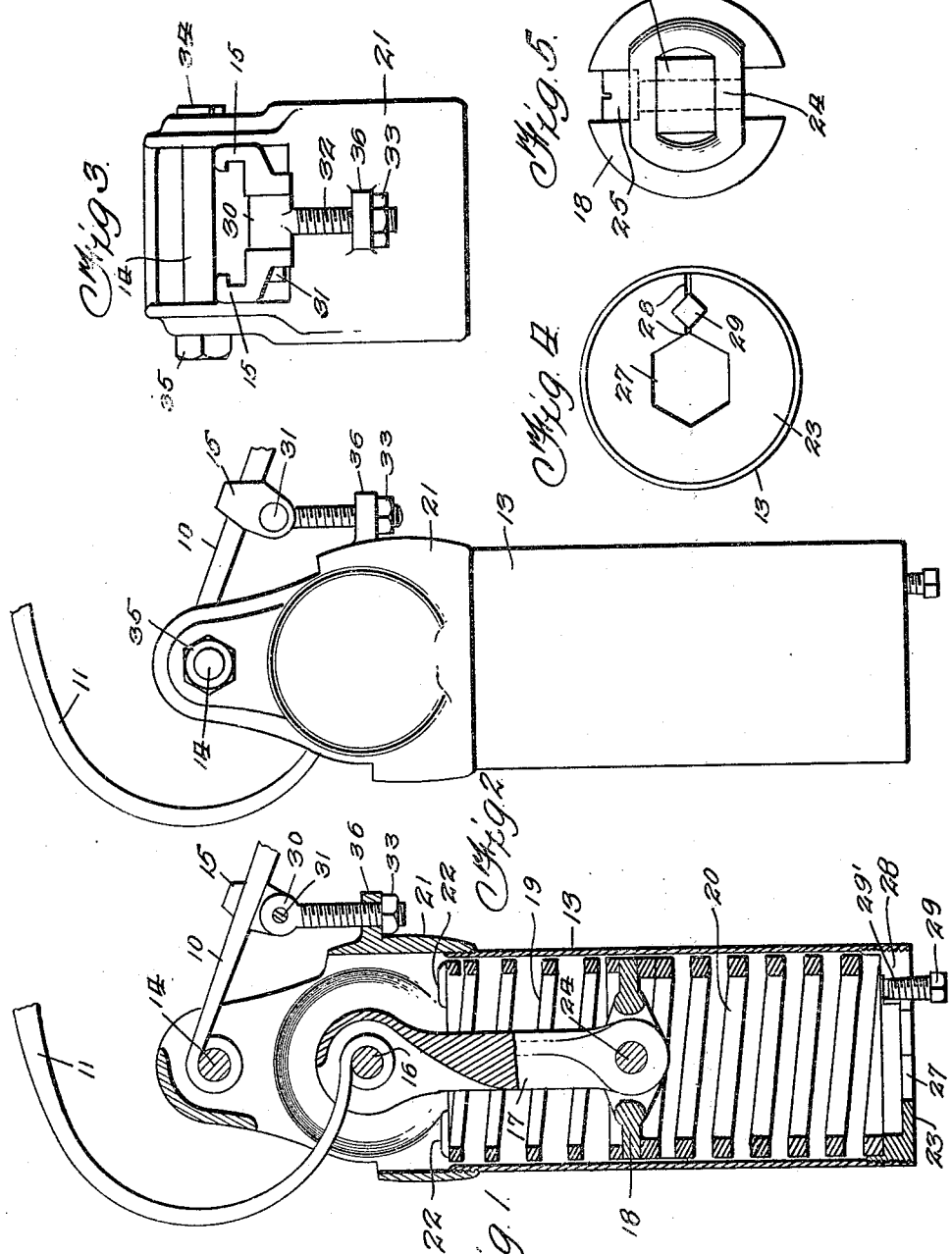

UNITED STATES PATENT OFFICE.

RICHARD T. NEWTON, OF NUTLEY, NEW JERSEY.

VEHICLE.

1,273,087.   Specification of Letters Patent.   Patented July 16, 1918.

Application filed April 13, 1914. Serial No. 831,442.

*To all whom it may concern:*

Be it known that I, RICHARD T. NEWTON, a citizen of the United States, and resident of Nutley, in the county of Essex and State of N. J., have invented certain new and useful Improvements in Vehicles, of which the following is a specification.

This invention relates to vehicles provided with shock eliminators or supplemental springs, and has in view the prevention or neutralization of shocks and vibrations when a wheel passes over ruts, ridges or other obstacles, and also to neutralize vibrations caused when the wheels pass over smooth roads, in both of which functions this invention causes a great saving in the use of pneumatic tires.

The invention consists essentially of a vehicle provided with casings held by and connecting contiguous leaf springs, said casings containing coiled springs and actuating parts, all arranged as will now be described, reference being had to the following specification and claims and the drawing in which—

Figure 1 is a section through a container showing its interior working parts and the manner in which the leaf springs are attached, Fig. 2 is an elevation of the casing and leaf springs attached to the casing and to the rod of the partition, Fig. 3 is a detail showing the constructions of the head 21, Fig. 4 is a detail showing the screw threaded plug 23, and Fig. 5 is a detail of the partition 18, showing the bolt that passes through it.

Referring to the drawing there is shown a leaf spring 10, attached at 14 to the head 21 of the casing 13. Connected with a vehicle is the leaf spring 11 attached at 16 to the rod 17, whose other end is attached to the partition 18 by means of the bolt 24 having a flat head 25. The bolt 24 is inserted so that the flat part of the head 25 lies flush with the partition 18. When the springs 19 and 20 are placed so as to come in contact with the flat part of head 25, the bolt 24 is held securely in place and is prevented from falling out by this very simple expedient. In the casing 13 are the coiled springs 19, and 20 separated by the partition 18. Attached to the head 21 of the casing 13 are the fastening elements 15, 15, shown in Fig. 3, these being united as well as regulated in position by means of the screw 31 passing through the cylindrical portion 30 held in place by and regulated in position by means of the screw 32, provided with the milled head 33 and passing through the ear 36 integral with the casing 21. On the interior of the head 21 are the lugs or projections 22, usually four in number which form the limit of the upward position of the spring 19. At the bottom of the casing is the screw plug 23 having an opening 27. On the one side of this opening it has a narrow slot 28 which is adapted to be expanded by the conical male screw 29. At the top of the head 21 is the bolt 14 held in place by the head 34 and the nut 35.

In assembling the device the head 21 which is screw threaded interiorly is first attached to the casing, screw threaded at the top exteriorly, the spring 19 is inserted and then the rod 17 and partition 18. The spring 20 is then inserted. The plug 23 is applied and the springs are compressed until the screw thread of the plug will engage the interior screw thread of the lower part of the casing 13. The plug 23 is then screwed in until the springs have the desired tension. In general, it may be stated that the springs have the correct tension when they are compressed a distance equal to twice the amplitude of the reciprocation of the partition 18. By this arrangement one spring will always follow the other as the partition moves so that the latter is always under tension, whereby clicking or hammering is always prevented as well as recoil vibration and crystallization of the springs. Under ordinary conditions the shocks from ruts are more frequent than those from ridges. For this reason the lower spring is considerably heavier than the upper one. After the plug 23 is screwed in the requisite distance, its position is accurately and firmly retained by the conical set screw 29, which expands the slot 28 and with it the exterior surface of the plug.

Owing to the constant tension on the partition 18 the action of the coiled springs is very efficient not only on rough roads but on the smoothest roads. They have substantially the same effect as rubber tires inflated to the very highest pressure that is feasible. On smooth roads it makes the movement of a vehicle so even that it approximately resembles the movement of a boat on smooth water. The springs will have to be replaced when they have lost any considerable proportion of their elasticity through fatigue, but their use is none the less economical in a very high degree because the cost of the springs replaced is only a very small percentage of the cost of the rubber tires that would otherwise have been worn out if no coiled springs of this character had been used.

What I claim as new is:

1. In a vehicle, a leaf spring, a casing rigidly attached to the spring, coiled springs in the casing, a partition between the coiled springs and a rod flexibly connected with the partition and connected at the other end with one of the leaf springs.

2. In a vehicle, a leaf spring, a casing attached to the spring, coiled springs in the casing, a partition between the coiled springs, a rod flexibly connected with the partition and connected with one of the leaf springs, and a bolt connecting the casing with another leaf spring.

3. In a vehicle, a leaf spring, a casing rigidly attached to the spring, coiled springs in the casing, a partition between the coiled springs and a rod flexibly connected at one end with another leaf spring and at the other end connected with the partition.

4. In a vehicle, a leaf spring, a casing attached to the leaf spring, coiled springs in the casing, a partition between the coiled springs, a rod connected at one end to another leaf spring and at the other end to the partition by means of a bolt, said bolt being prevented from turning by pressure against it of one of the coiled springs.

5. In a vehicle, a leaf spring, a casing attached to the leaf spring, coiled springs in the casing, a partition between the coiled springs, a rod connected at one end to another leaf spring and at the other end to the partition by means of a flat headed bolt connecting the rod with the partition, the bolt being prevented from turning by one of the coiled springs pressing against it.

6. In a vehicle, a leaf spring, a casing attached to the spring, coiled springs in the casing, a partition between the springs, means for actuating the partition, a threaded plate at one end of the casing, provided with a slot a conical female screw thread, and a male conical screw fitting in the latter adapted to expand the slot and plate and keep the latter in a definite position.

Signed at New York, in the county of New York and State of N. Y., this 25th day of March, A. D. 1914.

RICHARD T. NEWTON.

Witnesses:
C. A. O. ROSELL,
J. P. GANNON.

Copies of this patent may be obtained for five cents each, by addressing the "Commissioner of Patents, Washington, D. C."